UNITED STATES PATENT OFFICE.

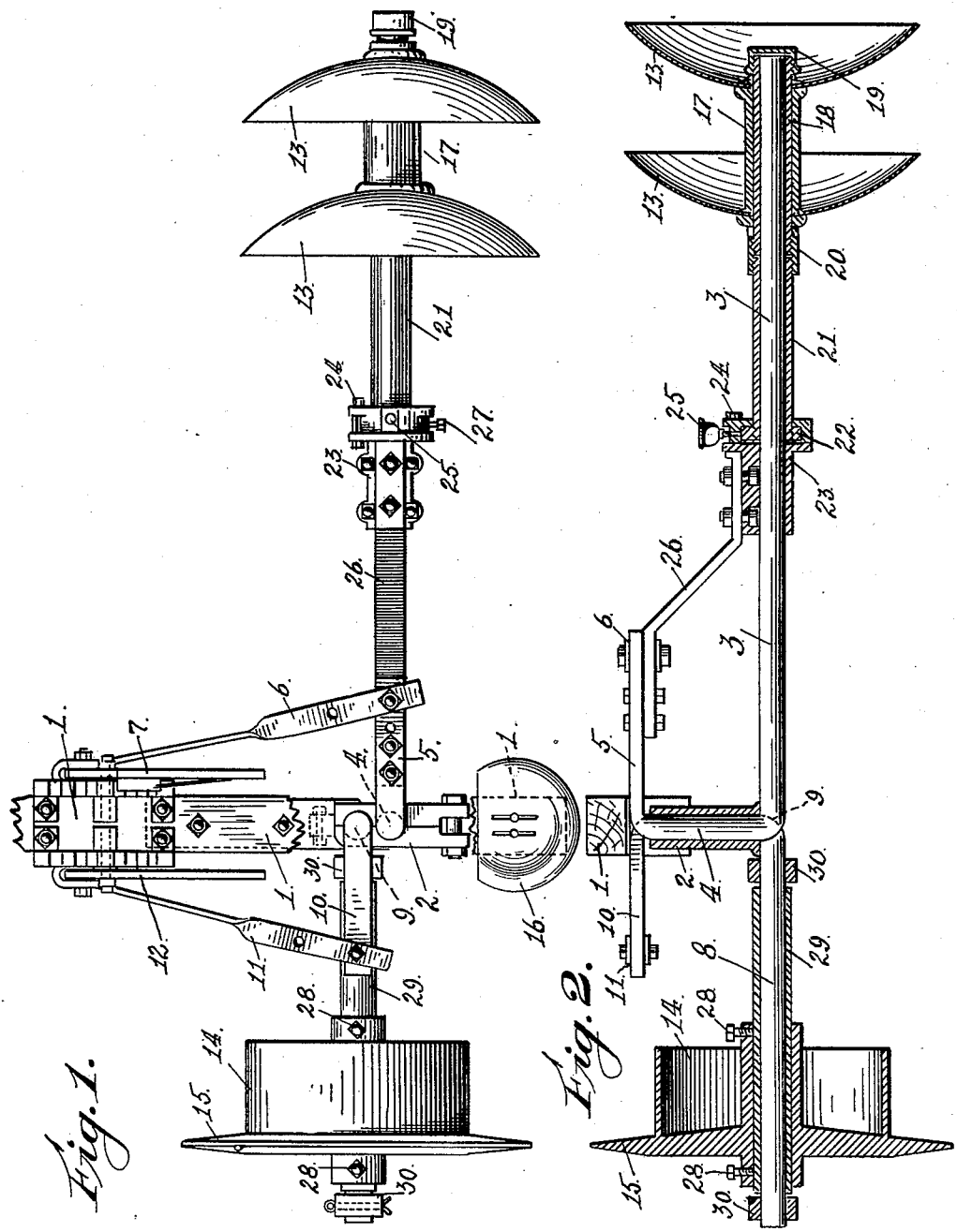

JAMES PORTEOUS, OF FRESNO, CALIFORNIA.

REVERSIBLE BEARING FOR TREE-PLOWS.

999,864. Specification of Letters Patent. Patented Aug. 8, 1911.

Application filed February 1, 1910. Serial No. 541,214.

*To all whom it may concern:*

Be it known that I, JAMES PORTEOUS, a citizen of the United States, residing at Fresno, in the county of Fresno and State of California, have invented certain new and useful Improvements in Reversible Bearings for Tree-Plows and the Like, of which the following is a specification.

My invention relates to that class of plows in which the beam carries laterally projecting opposing axles pivotally connected at their inner ends with the beam, whereby they may be moved to an angle with the line of draft, forward or back, to throw the earth either way and balance the draft.

My invention has for its object the provision of a plow of this general type, which by reason of its novel draft balancing device and the novel construction and arrangement of its parts is especially adapted for a tree-plow, and to this end my invention consists in the novel plow and its construction and arrangement, which I shall hereinafter fully describe by reference to the accompanying drawings in which—

Figure 1 is a plan of my tree-plow, the disks being shown to throw the earth from the trees. Fig. 2 is a rear sectional elevation of the same, the disks being shown to throw the earth to the trees.

1 is the draft-beam, under which, near its rear end is secured the axle-carrying box 2, in which provision is made for pivoting the stems of two axles. One of these axles 3, is the plow-disk axle, and it is the longer one. It has at its inner end an upright stem 4, which is journaled in one of the seats of box 2, and said stem is provided on its top with a lever arm 5, from which the link 6 extends to the operating lever 7. The other axle 8 is relatively short, its inner end being provided with an upright stem 9, having a lever arm 10, from which the link 11 extends to the other operating lever 12. The object of these constructions is to enable the axles to be set at the required angles to the line of the beam and to enable either axle to be set separately at any angle relatively to the other.

Upon the axle 3 are the disk-plows 13. There may be one or more of these. In practice, I employ a gang of two, as shown. Upon the axle 8 is the draft-balancing flanged-wheel 14. It has a relatively wide body or tread, and a deep flange 15, which in its best shape, in order to cause it to readily enter and hold in the ground, is made with a double taper or bevel, as shown.

Before describing certain details of construction and improvement, it will be well to describe the essential operation of the implement, independently of or without regard to said details.

The main object of the invention is to plow under trees and close up to their trunks. The plows, therefore, need be on one side only. But, as with disk-plows, the disks must be turned to an angle with the line of draft, to make them throw the earth, it follows that there is a strong side-draft, to counteract which it is necessary to provide equivalent resistance or balance on the opposite side. This is the function of the flanged-wheel 14, which with its wide tread and its sharp deep flange 15 is well adapted for the purpose. Its relative size and the short leverage of its pivoted axle, permit it to offer the necessary resistance, without unnecessarily cutting up the ground, as a gang of disks would do if opposed to the first gang; and by being close up to the machine, the compactness of the implement is assured, and I am enabled to provide a plow of this general type which is specially adapted for work under and close up to trees. When the disks are required to throw the earth to the trees, their dished faces are set outwardly, as in Fig. 2, and the axle 3 which carries them is thrown to a forward angle. The other axle 8 is likewise thrown forwardly to such angle as will be sufficient to cause its flanged-wheel to offer the necessary resistance and relieve the side-strain. When the disks are required to throw the earth from the trees, their dished faces are turned inwardly, as in Fig. 1, and the arms 3 and 8 are thrown to backward angles. In this operation, the two operating levers 7 and 12 enable the driver to independently and accurately adjust the angles.

A point of advantage lies in the position of the driver's seat 16. It is set low down, directly upon the rear end of the beam 1, behind the line of the axles, and is made adjustable on said beam, as shown. In this position it not only enables the driver to be close to and back of the plows, so that he can conveniently watch their work, but it also serves, by the weight of the driver to balance the weight of the beam on the horses' necks and thereby materially relieve them.

The axle 3 is a non-rotary one, the disks rotating upon it. The means for mounting the disks, so that they can be conveniently removed for the reversal of their dished faces, to throw the earth to or from the trees, and by which a practical dust proof journal, capable of being easily lubricated is provided, may now be noticed. The disks are clamped in the ends of a hub 17 which is fixed upon a journal sleeve 18, mounted rotatably upon the outer portion of the shaft 3. A cap 19 screwed upon the end of the sleeve covers the end journal surfaces and excludes dust. The other end of the sleeve 18 is screwed into a coupling nipple 20 on a second journal sleeve 21, mounted rotatably upon shaft 3. The inner end of the second sleeve, has upon it a thrust and pull collar 22, said collar and sleeve end being inclosed and housed in a sectional box 23, the outer side of which is removable being secured by bolts 24. This box is fitted with an oil cup 25 and is held by a brace 26 which comes down from and is bolted to the lever arm 5 of the stem 4 of the axle 3. A set screw 27 is fitted to the box 23, and is adapted to bear on the thrust and pull collar 22, when the latter is to be held against turning while reversing the disks as I shall presently describe. The effect of this construction is four-fold. It provides, first, for a dust-proof journal, covered throughout and closed at each end; second, it furnishes a ready means for lubricating the whole journal, and for cleaning out the box, by simply removing two bolts and taking off the front of the box; third, it holds the parts well together, and by the removal of the cap or front of the sectional box 23, the entire journal may be dismembered; and fourth, it provides for the convenient removal and reversal of the disk gang, which is done by first setting the screw 27 to hold the collar 22 from turning, and then unscrewing the outer sleeve 18 from the nipple 20, removing the cap 19 from the end of the sleeve, then screwing said previously capped end into the nipple 20, and replacing the cap on the other end, and finally relieving the set screw 27.

The flanged wheel 14 is mounted adjustably on the axle 8, so that its position may be varied to regulate its strain-resistance function according to the necessities of the case. This adjustment is made by mounting it with set screws 28 on a sleeve 29 journaled on the axle 8 said sleeve extending between nuts or collars 30 on said axle.

In this machine there is no frame or woodwork above the disks, and they can therefore pass easily under low branches and work close up to the trees.

Having thus described my invention what I claim as new and desire to secure by Letters Patent is:—

1. A reversible bearing for rotary elements comprising an axle, a rotary element carrying sleeve rotatably mounted on the outer portion of said axle, the end portions of which are similarly formed, a second sleeve rotatably mounted on the axle and detachably connected to one end of said first mentioned sleeve, said second sleeve being provided at one end with a thrust and pull collar, a sectional boxing supported on the axle and housing said collar, and a cap removably secured on the outer end of said first mentioned sleeve and covering the outer end of the axle.

2. A reversible bearing for rotary elements comprising an axle, a rotary element carrying sleeve rotatably mounted on the outer portion of the axle and provided with similarly formed threaded ends, a second journal sleeve rotatably mounted on the axle, a nipple on the outer end of said second journal sleeve in which the near end of the first journal sleeve is secured, a thrust and pull collar on the inner end of the second journal sleeve, a separable box on the axle in which the collar is housed, a set screw threaded in said box and adapted to engage the collar to hold the same when the first sleeve is being unscrewed from the nipple to reverse the rotary element carrying sleeve, and a cap screwed upon the other end of the first sleeve and covering the axle end.

In testimony whereof I have signed my name to this specification in the presence of two subscribing witnesses.

JAMES PORTEOUS.

Witnesses:
C. J. CRAWFORD,
IRENE WILSON.

---

Copies of this patent may be obtained for five cents each, by addressing the "Commissioner of Patents, Washington, D. C."